Figure 1:
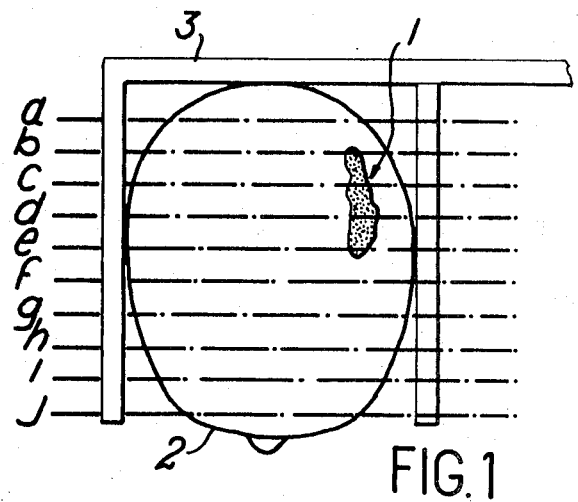

United States Patent

[11] 3,614,426

[72] Inventor  Gerald Donzelle
              109, rue d'Ermont, 95 Saint-Prix, France
[21] Appl. No. 831,497
[22] Filed     June 9, 1969
[45] Patented  Oct. 19, 1971
[32] Priority  June 11, 1968
[33]           France
[31]           154,563

[54] HOLOGRAPHIC PROCESS
     4 Claims, 4 Drawing Figs.
[52] U.S. Cl. .................................................. 250/61.5,
                        250/65 R, 350/3.5, 356/156
[51] Int. Cl. ........................................................ G01n 23/04
[50] Field of Search .......................................... 350/3.5;
                                                         250/65

[56]              References Cited
                  OTHER REFERENCES

3– D Halograms by E. G. Nashimbene IBM Technical Disclosure Vol. 8 No. 10 March 1966

The Technology Review Vol. 69, No. 7, May 1967 Recent Advances in Holography by Strope p. 7

Society of Photo-Optical Instruments of Engineers Proc. Vol. 15, 1959 The Three Dimensional Reconstruction of People and Outdoor Scenes Using Multiplexing by J. O. Redman PP. 117– 122

Applied Optics Vol. 6, No. 9 Sept. 1967 Hologram-Maire Interferometry for Transparent Obj. by Brandt

*Primary Examiner*—James W. Lawrence
*Assistant Examiner*—D. C. Nelms
*Attorney*—Cameron, Kerkam & Sutton ABSTRACT: An object is located in an opaque environment permeable to radiation by recording a plurality of images of the object and these images are recorded when in the relative relationship to the parts of the object. The object or its reproduction is then displayed in conjunction with the relief image produced from the composite recording.

PATENTED OCT 19 1971

3,614,426

SHEET 1 OF 2

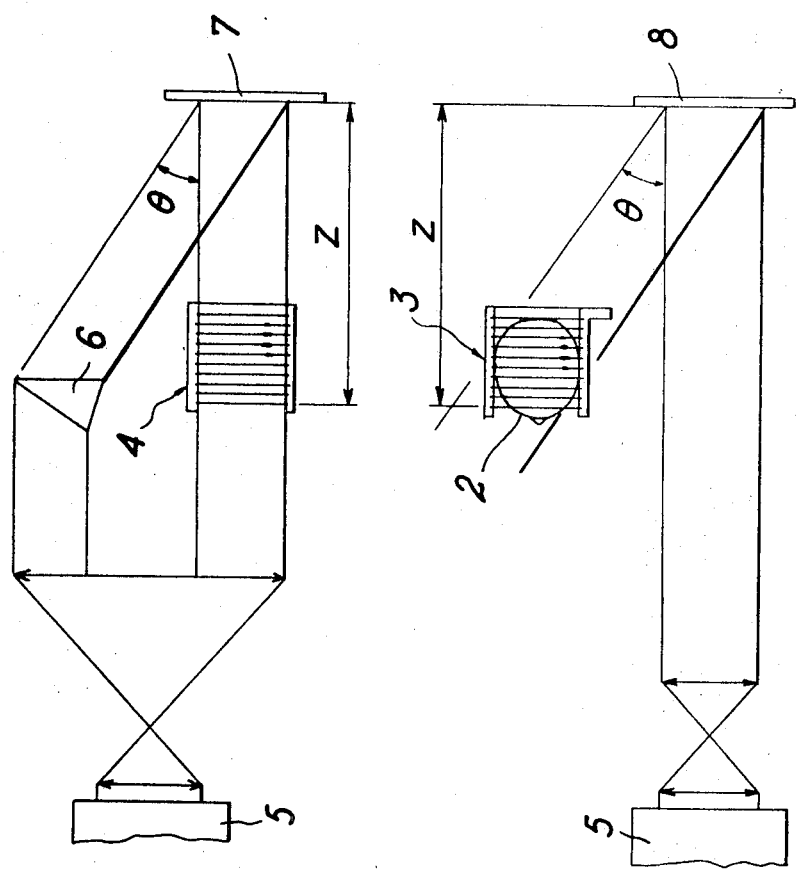

HOLOGRAPHIC PROCESS

The present invention relates to a process using holographic techniques in order to locate a radiologically visible or identifiable object inside an environment which is opaque but permeable to radiation, and to make the said object appear in relief and possibly in color. The invention also relates to an installation which is necessary in order to use this process.

Such a process may be used to particular advantage, but not exclusively, in the field of medicine. In surgery especially, it makes it possible to give the operator an overall view so that he can determine, with the aid of conventional anatomical reference marks, the best way of access to the lesion or foreign body. It furthermore enables a permanent check to be kept on the progress of the intervention without any preoperative radiography by determining the spatial and angular relationships between instruments and lesion, and even allows the diseased zone to be identified by differential coloring of the image when it cannot be identified by sight. The process to which the invention relates moreover makes it possible:

—in radiotherapy, to determine the axes of irradiation more easily in multifocal therapy, —in radiology, to identify and position certain images which are difficult to understand.

In the present state of the art, radiological locating systems make use either of radiography at various incidences (front, profile, three-quarters), or of tomography, which supplies a radiographic image of a plane of the said object by optically subtracting images which are not situated in the said plane. In both cases, the radiographs obtained oblige the examiner to carry out some interpretative work in order to derive from them a spatial view, which in any case cannot be directly used and often requires to be worked on goniometrically, as is the case for example in stereotaxic surgery and in searching for foreign bodies.

The object of the present invention is above all to enable the examiner to see a life-size image in relief of a given zone, even inside the body, exactly as if the latter were transparent.

To be more precise, the present invention concerns a process for locating and visualizing a radiologically visible or identifiable object inside an environment which is opaque but permeable to radiation, characterized in that it resides:

—in first of all making a group of radiographs and/or tomographs on which the object to be visualized appears, —in then recording on a single photographic plate a hologram of the prints obtained by disposing them so that the relative positions of the images which they represent are restored, —then in disposing the said object or its reproduction strictly in the place where the relief image restored by the said hologram is formed so that if it is observed through the suitably illuminated hologram the said image is superimposed on the said object or on its reproduction.

The invention also concerns an installation which is necessary in order to use this process, characterized in that it comprises:

—a radiographic appliance,

—a frame enabling the prints supplied by the said appliance to be placed in positions which restore the relative positions of the images which they represent, —a holographic device, —and an optical system for making use of the hologram supplied by the said device, enabling the restored relief image to be superimposed on the radiographed object or on its reproduction.

Other features and advantages of the present invention will become apparent from the following description, which is related to the appended drawings and gives, by way of explanation but in no way involving any limitation, one particular form of use of this process in cranial surgery and using only tomographs.

Figure 2:
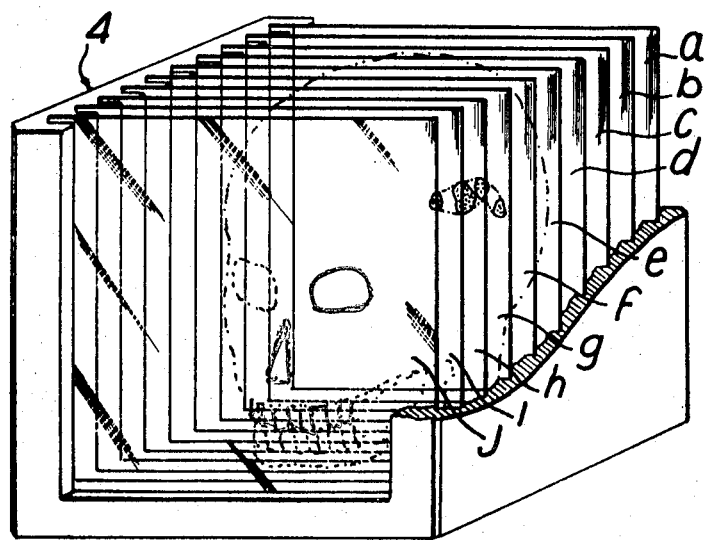

In these drawings:

FIG. 1 diagrammatically illustrates a view from above of an intracerebral tumor inside a human cranium held in a stereotaxic frame, FIG. 2 illustrates some tomographs of the cranium arranged inside a positioning frame, FIG. 3 illustrates the hologram of this arrangement being recorded, finally, FIG. 4 illustrates the relief image supplied by the hologram superimposed on the cranium itself.

FIG. 1 shows an intracerebral tumor 1 inside a human cranium 2 locked in a stereotaxic frame 3. The process according to the invention, which will make it possible to visualize this tumor in relief inside the cranium of the patient as if it were transparent, comprises four essential steps.

The first step resides in using a tomographic appliance to make a series of tomographs of the cranium, substantially on a scale of unity, for example in equidistant vertical planes which are shown diagrammatically in FIG. 1 by the lines bearing the references $a$ to $j$. The four tomographs concerned by the tumor are those corresponding to the sectional planes $b$, $c$, $d$, and $e$.

The second step of the process, illustrated in FIG. 2, will reside in arranging the series of tomographs obtained inside a rigid frame 4, making them occupy positions which restore as strictly as possible the relationships of the sectional planes which they represent between themselves and with the stereotaxic frame 3.

In a third step of the invention, the hologram of this arrangement is recorded as indicated for example in FIG. 3. Part of the light beam emitted by a continuous laser 5 is directed on to the frame of the tomographs 4, while the remainder is deflected through an angle $\theta$ by means of a deflector prism 6, so that the transmitted beam and the deflection beam interfere and describe a hologram on a thin photographic plate 7 disposed at a distance Z from the mounting.

In the last phase of the process, illustrated in FIG. 4, the holographic print 8 is replaced at the same distance from the laser 5 as when it was being printed, and is once more illuminated by the beam of coherent light. If the invalid is then disposed so that his cranium 2, held in the stereotaxic frame 3, is strictly in the place where the virtual image of the tomographic arrangement is formed, that is to say in a direction at an angle $\theta$ with that of the incident beam and at a distance Z from the print 8, on the same side as the laser, observation of the patient through the said print will reveal a life-size relief image of the successive sections through the tumor, exactly as if the cranium were transparent. It will easily be realized that the surgeon is then provided with greater facility in determining the surgical way of access and then carrying out his intervention.

If it is desired to obtain greater accuracy in locating and visualizing the tumor, the same photographic plate may have been superimposed on it a plurality of holograms each corresponding to a series of tomographs taken in a given reference plane (for example, a horizontal plane or a vertical plane). Instead of recording the hologram of all the tomographs of the same series at once, the holograms of each of the said tomographs may be recorded one by one. This makes it possible to avoid the necessity for using a relatively high-powered laser because of light absorption by the first prints.

It is also possible to cause only the image of the diseased zone to appear upon reconstitution. It is thus possible for example to record on the same photographic plate the holograms of two reversed series of tomographs taken in the same planes, one without preparation and the other after injection of a contrast liquid which becomes selectively fixed in the vascular system of the diseased part. This method is doubly advantageous. It makes it possible on the one hand to eliminate undesirable images, such as those of bones (cranial surgery), and on the other hand to visualize a radiologically abnormal zone, even if it is not visibly different from the healthy zone which surrounds it.

It is moreover certain that the tomographs may be tinted so that, when working with two lasers having different fields of emission (for example with a helium-neon laser and an argon laser), a colored image of the organ concerned is obtained upon reconstitution. It is also possible in this case to use a very thick photographic emulsion enabling reconstitution to take place in white light.

Ordinary tomographs and radiographs may also be associated on the same plate in order to obtain greater accuracy as regards anatomical reference marks (for example: association of frontal tomographs and a horizontal or oblique radiograph).

In the case in which difficulties are involved in obtaining life-size tomographs, consideration may be given to the use of optical tricks in order to restore the scale of unity; thus for example the dimensions of the image may be adjusted at will by interposing a variable focus (zoom) system in the path of the image beam, followed by a semireflecting mirror, and observing the patient through this mirror.

Furthermore, the image beam or the illumination of the subject may be controlled in intensity by using a system comprising polarizing slats.

The process to which the invention relates is described with reference to a holographic arrangement involving transmission without any diffuser, but it goes without saying that a piece of ground glass may be introduced into the probing beam between the laser and the arrangement of tomographs. This amounts to replacing the incident wave by a wave which is random in amplitude and phase, but which is nevertheless stationary in time by virtue of the temporal coherence of the laser. From a practical point of view, it is highly advantageous to introduce a diffuser: it enables the virtual image to be visually observed through the hologram as if the latter were a window. In fact, since the hologram contains information relating to the object and to the diffuser, it reproduces them together upon reconstruction, and the virtual image is seen as if it were illuminated by diffused light. It is moreover to be clearly understood that any other means of obtaining holograms may be used.

It goes without saying that the invention is not limited to the single form of use which has been illustrated and described by way of explanation, and that the scope of the present patent also covers variants of all or some of the arrangements described which are still within the framework of equivalent means, and also covers any use of such arrangements. In particular, the present description refers to a use in medicine, but it is clear that the invention may have industrial uses; the process is capable of use on any scale, and the object being radiographed may be replaced if necessary by its reproduction on a smaller or larger scale, which makes it possible for example to consider uses in metallography and radioastronomy, and in making use of bubble-chamber prints.

I claim:

1. Process for locating and visualizing a radiologically visible and identifiable object inside an environment opaque to radiations of visible wave lengths and permeable to radiation of shorter wavelengths used in radiology comprising the steps of
    first making a group of tomographs on which the object to be visualized appears,
    then recording on a single photographic plate a hologram of said tomographs by disposing said tomographs so that the relative positions of the images which they represent are restored,
    then disposing said object or its reproduction accurately in the place where the relief image restored by said hologram is formed whereby when observed through the suitable illuminated hologram said image is superimposed on said object and on its reproduction.

2. Process according to claim 1, including the step of making a plurality of series of tomographs of the object from various directions, and then superimposing the holograms of each of said series on the same photographic plate.

3. Process according to claim 1, wherein the hologram of the prints is recorded at once.

4. Process according to claim 1, wherein the hologram of each of the prints are recorded one by one.